United States Patent [19]

Downing et al.

[11] Patent Number: 4,765,906

[45] Date of Patent: Aug. 23, 1988

[54] CROSS-FLOW FILTRATION

[75] Inventors: Anthony L. Downing, Welwyn; Rodney C. Squires, South Godstone, both of England

[73] Assignee: EPOC Limited, London, England

[21] Appl. No.: 838,515

[22] Filed: Mar. 11, 1986

[30] Foreign Application Priority Data

Mar. 12, 1985 [GB] United Kingdom ............... 8506350
Aug. 19, 1985 [GB] United Kingdom ............... 8520736

[51] Int. Cl.⁴ .............................................. B01D 13/00
[52] U.S. Cl. .................................... 210/636; 210/651; 210/321.69; 210/321.89
[58] Field of Search ............. 210/321.1, 321.5, 333.01, 210/333.1, 483, 651, 652, 636, 409, 411, 321.69, 321.89

[56] References Cited

U.S. PATENT DOCUMENTS

| | | | |
|---|---|---|---|
| 2,600,458 | 6/1952 | Ackler et al. | 210/323.2 |
| 2,861,649 | 11/1958 | Junkmann | 183/61 |
| 3,383,840 | 5/1968 | Johnson et al. | 210/323.2 |
| 3,431,201 | 3/1969 | Johnson et al. | 210/634 |
| 3,449,245 | 6/1969 | Johnson et al. | 210/321.1 |
| 3,503,789 | 3/1970 | Johnson et al. | 210/506 |
| 3,521,753 | 7/1970 | Schoening | 210/185 |
| 3,563,889 | 2/1971 | Cooper et al. | 210/321.1 |
| 3,577,339 | 5/1971 | Baird et al. | 210/23 |
| 3,589,516 | 6/1970 | Camirand et al. | 210/70 |
| 3,647,521 | 3/1972 | Tulin | 117/95 |
| 3,733,265 | 5/1973 | Kraus et al. | 210/767 |
| 3,738,813 | 6/1973 | Esmond | 210/321.5 |
| 3,759,391 | 9/1973 | Dreher | 210/494 |
| 3,778,366 | 12/1973 | Kraus | 210/353 |
| 3,784,470 | 1/1974 | Richardson et al. | 210/321 |
| 3,785,498 | 1/1974 | Fernandez, Sr. | 210/351 |
| 3,835,040 | 9/1974 | Mahlman et al. | 210/724 |
| 3,976,569 | 8/1976 | Sheppard et al. | 210/23 |
| 4,022,692 | 5/1977 | Janneck | 210/321.5 |
| 4,035,305 | 7/1977 | Miller et al. | 210/321.5 |
| 4,039,457 | 8/1977 | Schacht et al. | 210/493.1 |
| 4,045,192 | 8/1977 | Eckstein et al. | 55/222 |
| 4,048,074 | 9/1977 | Bruenemann et al. | 210/323.2 |
| 4,247,394 | 1/1981 | Schmidt, Jr. | 210/767 |
| 4,304,669 | 12/1981 | Knothe et al. | 210/321.2 |
| 4,390,575 | 6/1983 | Kopp | 428/36 |
| 4,476,022 | 10/1984 | Doll | 210/321.5 |

FOREIGN PATENT DOCUMENTS

| | | |
|---|---|---|
| 0079040 | 5/1983 | European Pat. Off. |
| 1422314 | 11/1964 | France |
| 288186 | 3/1965 | Netherlands |
| 1549302 | 7/1979 | United Kingdom |
| 1566264 | 4/1980 | United Kingdom |
| 1601872 | 11/1981 | United Kingdom |

OTHER PUBLICATIONS

Stavenger, Paul L., "Putting Semipermeable Membranes to Work", Chem. Engineering Progress (vol. 67, No. 3), 3/71, pp. 30-36.

(List continued on next page.)

Primary Examiner—Frank Spear
Attorney, Agent, or Firm—Fulwider Patton Rieber Lee & Utecht

[57] ABSTRACT

The filter has a spiral of, or parallel, spaced lengths of, double-ply material whose plies are seamed together along spaced, longitudinal seams to provide an array of side-by-side tubes. The filter support material is highly flexible and has a thickness not greater than 1 mm. Due to the tubular formation, the filter support has an uninterrupted filter zone of substantial area relative to the total area of the filter support; during filtration (when the filter support is under the pressure of the feed) the tube walls bulge out and the filter zone is restrained solely by tensile forces in the filter support itself. Substantial movement of the filter support is possible in the direction at right angles to its face when the pressures on either side of the filter support are equal. The filter support has many applications, but one application is when the filter is connected downstream of an aeration vessel with no intervening vessel, the concentrate outlet of the filter being connected to the aeration vessel for sludge return.

30 Claims, 9 Drawing Sheets

OTHER PUBLICATIONS

K. Treffry-Goatley, et al., "Reverse Osmosis Treatment and Reuse of Textile Dyehouse Effluents", Desalination, 47 (1983) pp. 313-320.

Ray Bertara, et al., "Development Studies of Crossflow Microfiltration", The Chemical Engineer, Jun. 1984, pp. 10-14.

K. Schneider and W. Klein, "The Concentration of Suspensions by Means of Crossflow-Microfiltration", Desalination, 41 (1982) pp. 263-275.

Hardt, et al., "Solids Separation by Ultrafiltration for Concentrated Activated Sludge", Journal of Water Pollution Control Federation, Dec. 1970, pp. 2135-2148.

Santo, et al., "Regeneration of Waste Water for Reuse through Hydroperm Micro-Filtration", Proceedings of Water Reuse Symposium, AWWA Research Foundation, 1979, pp. 1446-1486.

Engineers Australia, "New Process Treats Industrial Waste", Dec. 14, 1984, p. 40.

The BRBA Digest, No. 13, Nov. 1984, p. 6.

J. D. Henry, Jr., "Cross Flow Filtration", Recent Developments in Separation Science, 1972, vol. 2, pp. 205-225.

Kurt Kraus, "Cross Flow Filtration and Axial Filtration", Purdue University Engineering Bulletin, 1974, pp. 1059-1075.

Dahlheimer, et al., "Hyper Filtration", Industrial Engineering Chemical Process Design Development, vol. 9, No. 4, 1970, pp. 566-569.

Method for Determination of Stiffness of Cloth, British Standards Institution, 1961.

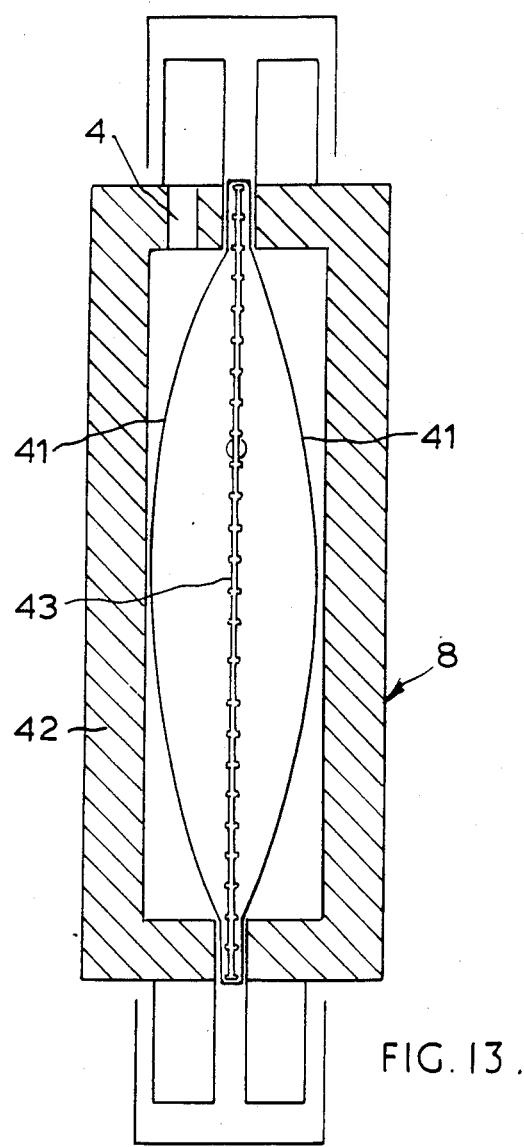
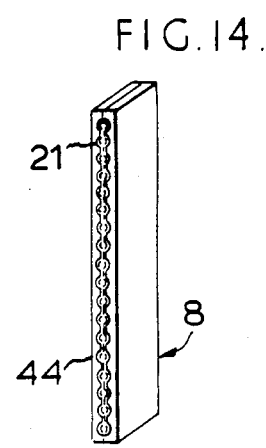
FIG. 13.
FIG. 14.

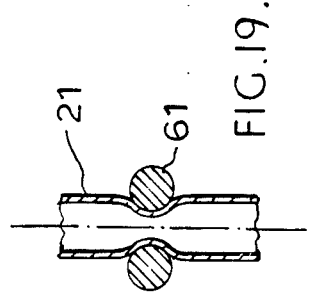
FIG.19.
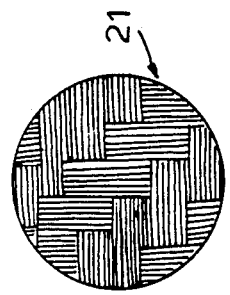
FIG.17.
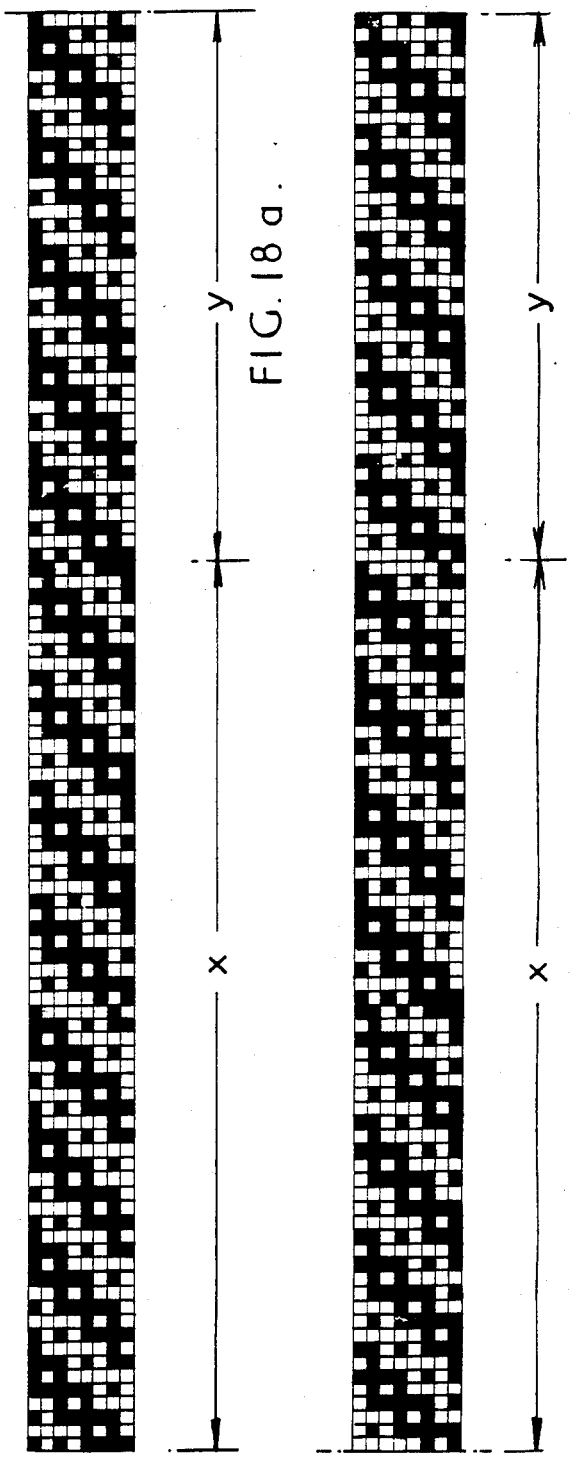
FIG.18a.
FIG.18b.

CROSS-FLOW FILTRATION

BACKGROUND OF THE INVENTION

1. Field of the Invention

The invention relates to cross-flow filtration. In general terms, the filter and method of filtration of the invention can be used for the removal of suspended matter of any size, i.e., having dimensions of sand grains or less, and the invention could be used for instance for dewatering or concentrating dredge spoil prior to dumping (not necessarily with a membrane on the filter support). However, the invention is preferably used for the particle sizes associated with micro-filtration or smaller, i.e. sizes associated with micro-filtration, ultra-filtration or reverse osmosis. The minimum retained particle sizes for micro-filtration and ultra-filtration may be considered to be very roughly $10^{-7}$ to $10^{-8}$ m (colloidal range) and $10^{-8}$ to $10^{-9}$ m (macromolecular range), respectively. Colloidal particles and suspended liquids such as oil could be held back. More particularly the filter and method of filtration of the invention are useful for treatment of wastewater, both industrial and domestic.

2. Related Art

Cross-flow filters are known, and comprise a filter support, which may form or merely support the actual filter material or (dynamic) membrane; the filter membrane may be formed by material circulated across the filter support before the feed is applied or may be formed by the feed itself, either as an inherent ingredient of the feed or as an additive to the feed. The membrane is often referred to as a pre-coat in microfiltration and as a gel coat in reverse osmosis. The filters also comprise an inlet for feed which is led to the filter membrane, an outlet for permeate which has passed through the filter membrane, and an outlet for concentrate which is not passed through the filter membrane; the outlet for concentrate will be arranged to ensure back pressure and may have a specific back pressure valve. The feed passes under pressure along the surface of the filter membrane and causes turbulence to occur adjacent to the filter membrane. Periodic cleaning is required, but the filter operates continuously for long periods; once an initial layer of retained material has been deposited on the filter support to form the membrane, the turbulence provided inhibits further deposition—thus cake build up is minimised and a good flow (flux) through the filter membrane is maintained. Although the cleaning of the filter membrane is not very frequent, it is important that the filter support should provide for effective cleaning and the removal of matter which tends to block the interstices or pores of the filter support and gradually reduce the efficacy of the filter. It is found that it is difficult, unless elaborate cleaning methods or systems are used, to dislodge such matter from effectively rigid filter media or from relatively thick filter media such as fire hose carcass material, into which matter penetrates deeply before retention.

In unpublished experimental work carried out by George Raymond Groves, a number of side-by-side fire hoses extended horizontally between the two spaced, horizontal beams. The material of the fire hoses was relatively inflexible. To clean by back-flushing, the lengths of hoses were moved past stationary jets by winding the hoses from one beam to the other. The fire hoses were cumbersome to handle when setting up the equipment, and the hose material gradually blocked up due to inadequate cleaning when back-flushing.

THE INVENTION

In a cross-flow filter, the invention provides a filter support which is highly flexible and has an uninterrupted filter zone of substantial area which is restrained during filtration, when the filter support is under the pressure of the feed, solely by tensile forces in the filter support itself, substantial movement of the filter support being possible in the direction at right angles to its face when the pressures on either side of the filter support are equal. The invention also provides a filter support which is in the form of a flexible double cloth material in which continuous and isolated tubes are formed as an integral array of side-by-side tubes, feed being passed into the tubes. The invention further provides a method of cross-flow filtration, comprising using the highly flexible filter support, the filter zone bulging out beyond a planar configuration; or using the flexible filter support in the form of a double cloth material and passing feed into the tubes. The invention in addition provides a highly flexible filter support which has sufficient tensile strength to provide a substantial, uninterrupted filter area without other mechanical support. The invention in addition provides a flexible filter support which is in the form of a double cloth material in which continuous and isolated tubes are formed as an integral array of side-by-side tubes.

The filter support of the invention can be highly flexible, and its flexibility is significantly greater than that of a normal fire hose carcase. The flexibility is discussed below under the heading "Flexibility Testing".

The filter support is collapsible, and there is no mechanical contact with the uninterrupted, effective filtering area of the filter support such as would normally be required in order to support the filter support in a direction at right angles to its face and in a direction opposed to the flow. The uninterrupted filter zone can be of substantial area relative to the total area of the filter support. The pressure of the feed (more specifically the differential pressure across the filter support and membrane) inflates the filter support, causing it to bulge out, and the filter support collapses at least to some degree when the pressure is relieved. The absence of mechanical contact over a large area of the filter support leads to more effective use of the filter support. However, the primary advantage is the ability to provide efficient cleaning of the filter support both mechanically and chemically for the removal of the membrane and filtered material, made possible by the high flexibility, structure and the thinness of the filter support. Back-flushing is normally used for cleaning, but even without back-flushing, removing the pressure and thereby causing the filter support to collapse can cause release of some trapped material. Back-flushing can be done with fluid applied to the external surface of the filter support. The fluid may be water, or may be compressed air, particularly when oily or greasy fluids are being filtered. Narrow jets of compressed air or high pressure water, applied to the external surface of the filter support, can be used to back-flush while the filter continues to operate, any membrane reforming immediately afterwards—local, momentary collapse of the filter support is effected by reversing the hydraulic gradient. The back-flushing however causes no kinking or pleating when filtering re-commences.

The filter support can be divided in modular form and be robust, and can have a wide application range and a very good temperature and chemical resistance, as well as being relatively cheap.

The filter support can be made in long lengths e.g. of tens of meters, the preferred minimum length being one meter, thereby reducing the number of end connections per unit area of filter support/membrane, and hence greatly reducing construction costs. Thus the filter support need not necessarily be encapsulated in a pressure vessel (except where safety requirements dictate this), and end piping connections can be made directly to e.g. each tube of the filter support. Flexibility aids the production, storage and use of long lengths.

General applications of the invention include:

(i) separation technique for colloidal/suspended solids—the feed can be of any nature, e.g., natural and partially treated waters, domestic and industrial wastewaters, sludges from the treatment of waters and of domestic and industrial wastewaters, sludges arising directly from industrial processes and spoil or slurries arising from operations such as dredging;

(ii) thickening of sludges;

(iii) retention of biomass or sludges in reactors—the reactor may be aerobic, anoxic or anaerobic. In an activated sludge plant, in which the reactor is aerobic, the biomass (activated sludge) can be separated from the flow of mixed liquor (biomass plus wastewater) using the cross-flow filter instead of by sedimentation, the biomass being recycled to the reactor(s). Because of the slow rate of settling of biomass by sedimentation, the use of the invention can greatly increase the concentration of biomass in the reactor(s), for instance from 4000 mg/l to 20000 mg/l or more. As the minimum residence time and hence the size of the reactor(s) required to achieve a given performance is roughly inversely proportional to the concentration of biomass, the capital cost of the reactor(s) can be greatly reduced, and it is believed that the filter can cost less than the sedimentation tank. In addition, the quality of the permeate can be better than from a conventional activated-sludge plant and may be equivalent to or better than that of a conventional plant when treated by coagulation, settlement and sand filtration. The power input may be higher, but the corresponding increase in cost is less than the saving otherwise achieved;

(iv) "polishing" of effluents;

(v) pretreatment, with or without prior coagulation or other chemical treatment, prior to ultrafiltration and reverse osmosis for removal of suspended solids, colloidal particles and organic foulants from waters, wastewaters and industrial effluents, e.g. from textiles, pulp and paper, sugar, chemicals, tanning, mining, beverages, brewing, distilling, food, fermentation, pharmaceuticals and other processing industries;

(vi) filtration of suspension of solids with poor settling characteristics;

(vii) as a substitution for and improvement upon sedimentation or other separation devices in reactor systems depending upon the separation and recycling of solids, biomass or other materials, e.g. in various forms of aerobic, anoxic or anaerobic fermentor for wastewater treatment or general fermentation or other biological and biochemical processes.

Further objects and advantages of the invention will become apparent from the drawings and detailed description of the invention below.

BRIEF DESCRIPTION OF THE DRAWINGS

FIGS. 13 and 14 are views of third and fourth filters in accordance with the invention;

FIG. 17 is an enlarged view of a filter support in accordance with the invention and shows one type of twill weave used in the case of a woven double cloth filter support;

FIGS. 18a and 18b are a weave diagram of a different filter support in accordance with the invention. FIG. 18b being the continuation of the right hand end of FIG. 18a;

FIG. 19 is a scrap horizontal section showing an alternative cleaning method.

DETAILED DESCRIPTION OF THE INVENTION

Figure 1:
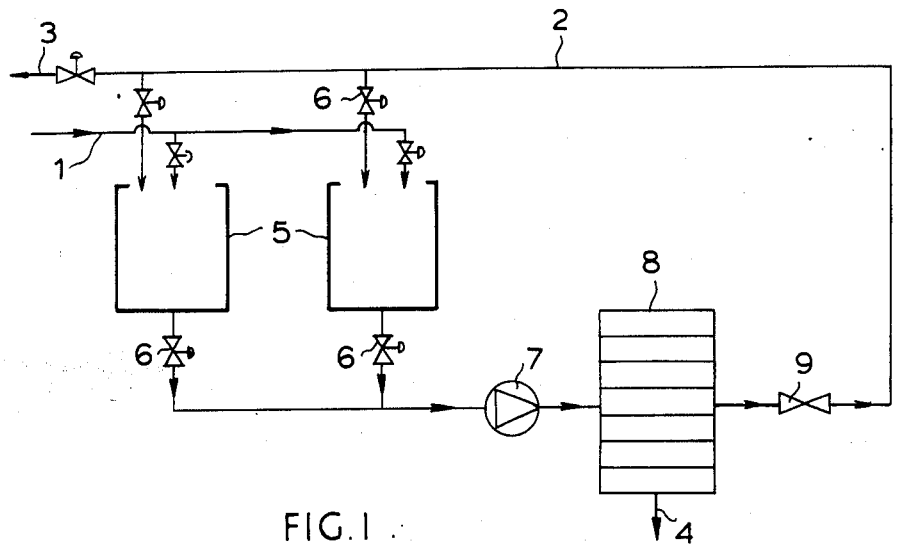
FIG. 1 is a generally schematic view, showing batch filtration in accordance with the invention.

In order to provide a filter 8 which is easy to clean and in which expense can be reduced by using a long length of filter support 21 and by making easy connections between the feed supply duct 1 and the filter support 21, the filter 8 has a spiral of, or parallel, spaced lengths of, double-ply material whose plies are seamed together along spaced, longitudinal seams to provide an array of side-by-side tubes. The filter support material is highly flexible and has a thickness not greater than 1 mm. Due to the tubular formation, the filter support 21 has an uninterrupted filter zone of substantial area relative to the total area of the filter support; during filtration (when the filter support 21 is under the pressure of the feed) the tube walls bulge out and the filter zone is restrained solely by tensile forces in the filter support 21 itself. Substantial movement of the filter support 21 is possible in the direction at right angles to its face when the pressures on either side of the filter support are equal. The filter support has many applications, but one application is when the filter is connected downstream of an aeration vessel 11 with no intervening vessel, the concentrate outlet 2 of the filter 8 being connected to the aeration vessel 11 for sludge return. This enables the size of the aeration vessel 11 to be substantially reduced.

The thickness of the filter support is the distance from face to face, ignoring any random protrusions, and is for many applications preferably not greater than 1 mm. A simple measurement can be made by laying the filter support on a flat platten, placing a thin sheet of glass on top, and measuring the average distance between the glass and the platten. The thickness is that of the filter support as would be present in the filter before start-up, i.e. ignoring any layer or membrane deposited on the filter support, either in order to prepare the support for filtration or as a layer of retained material during filtration. If the filter support is of a multi-layer type, the filter support as a whole must still be flexible and preferably has a thickness of not greater than 1 mm. The preferred maximum thickness is 0.6 mm to 0.8 mm and in practice thicknesses of 0.24 mm and 0.33 mm have been used.

The preferred filter support is a flexible textile product or fabric formed from natural, man-made or synthetic fibres, filaments or yarns or a combination thereof in spun or continuous form and of monofilament or multifilament configuration of either a single material or mixtures of e.g. synthetic polymers such as polyester, nylon and polypropylene, natural fibres such as cotton, glass carbon, glass-fibre, carbon fibre and stainless steel. Normally the fibres, filaments or yarns will be assembled in the filter support by a weaving, knitting, non-woven or stitch-bonding process to provide a low-cost, highly flexible and self-supporting filter support of suitable pressure rating.

In the case of a textile fabric, the preferred construction is a double cloth whereby each wall or layer of the double cloth is a homogeneous and tightly constructed single cloth in its own right. The double cloth construction is so arranged such that continuous and isolated tubes are formed as an array of side-by-side tubes in one direction, usually, in the case of woven or knitted filter supports, in the warp direction.

In the case of woven filter supports, there is a variety of weaves for making tubes (twill, plain weave, hopsack, card or combination thereof). Twill is a preferred weave providing suitable tightness as well as filtration capability of high flux—suitable tightness avoids pinhole leaks under pressure.

In the case of filter supports requiring very high strength, a triple or quadruple layer woven construction could be employed in each ply.

The preferred filter support is highly flexible to allow for ease of cleaning e.g. by back-flushing or by stop and start operation involving the partial collapse of the filter support, and for assembly into e.g. a spirally configured module without creasing, and for assembly into a linearly configured module without major alignment problems; is suitable for manufacture into long lengths to minimise the number of manifold connections required; is of tight construction to separate e.g. suspended solids or metal hydroxide floc particles; is of high pressure rating to allow long lengths to be assembled into modules; and is of a construction that minimises particle entrapment in the filter support itself, i.e. provides ease of cleaning and little pore clogging.

The preferred filter support construction, for applications requiring a membrane layer or precoat, is capable of separating particles such as aluminium or ferric hydroxide flocs, diatomaceous earth, bentonite or other similar filtration aids from water when the filter support is subjected to a pressure in the range 1.5 to 150 p.s.i. (although these values are not exclusive).

The filtration capability is dependent on the filter support and on the characteristics of any layer or membrane deposited on the filter support. The layer or membrane can be self-healing if it is damaged or punctured. The layer may be formed by constituents of the feed or by laying down a specific layer of for example hydroxide floc. Multi-layer coatings can be used, in which a first coating of e.g. kieselguhr, bentonite or cellulose is overlain by a second coating of e.g. a metal hydroxide such as iron, aluminium or zirconium hydroxide. In a general sense, the technology for applying the coating is well known. The various possible operational modes can be considered as follows:

(i) untreated filter support;

(ii) inert filtration aids (e.g. diatomaceous earth, bentonite, activated silica, asbestos fibre or cellulosic fibre) added to the feed;

(iii) metal hydroxide (e.g. iron, aluminium or calcium) added to the feed;

(iv) other materials, compounds or coating chemically bonded or otherwise attached to the filter support, usually before installation.

Using the present invention, it is preferred in some applications to avoid the addition of coagulents to the feed except during an initial feed to provide a pre-coat layer or membrane. Even for the treatment of water for potable uses, the continuous dosing of coagulating or other water treatment chemicals may not be required, once the pre-coat layer is established.

The preferred filter support is in the form of a tube supported at its ends, for instance comprised in an integral array of side-by-side tubes—the internal diameter of the tube may be for instance from 5 or 10 to 40 mm or up to 200 mm. The advantages of a tube are low cost, high burst strength and durability, and tubes enable modules to be provided without difficulty and are also less prone to blocking. An array of tubes can provide a single module—for example for 25 mm internal diameter tubes, the array may have 22 to 46 tubes using standard weaving widths of one to two meters in the case of a woven filter support, and be several hundred meters long. A hundred meter array of twenty two tubes of 25 mm internal diameter has a filtration area of 170 m². Tube life times may be one to three years, depending on the severity of the application.

The filter support will normally form part of a replaceable module which will consist of the tube array, tube connection headers, piping and valves. The individual tubes in the array may be connected in parallel or in series or in parallel/series combination.

FIGS. 1 TO 3

Figure 2:
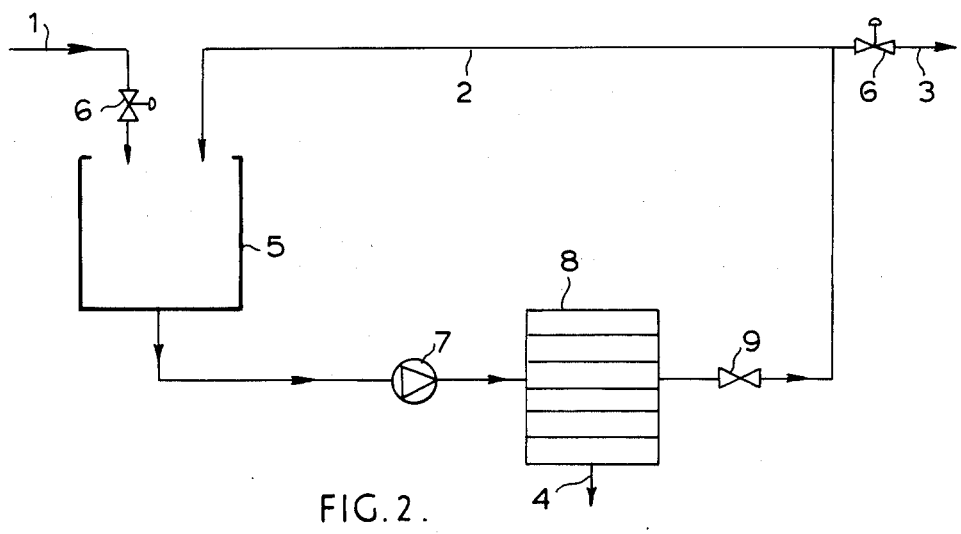
FIG. 2 is a generally schematic view, showing feed and bleed filtration in accordance with the invention.
Figure 3:
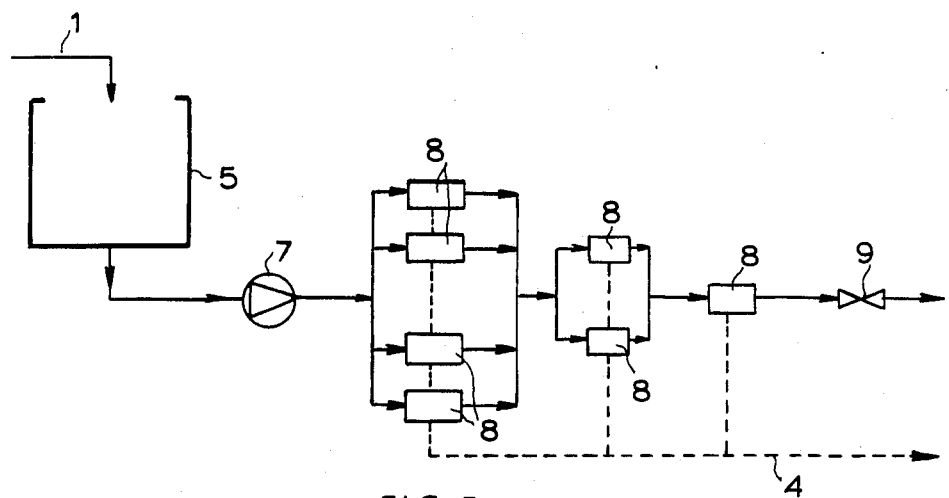
FIG. 3 is a generally schematic view, showing series taper filtration in accordance with the invention.

FIGS. 1 to 3 illustrate that batch concentration, feed and bleed or continuous once-through filtration are possible. FIGS. 1 to 3 show feed, recycle, concentrate and permeate lines 1, 2, 3 and 4, storage vessels 5, control valves 6, pumps 7, cross-flow microfilters 8 in accordance with the invention, and back-pressure valves 9.

FIG. 3 shows a series-taper module configuration such as would be used in continuous operation in a large plant; for instance the number of filters 8 in the individual stages can be 16-8-4-2-1, and one can obtain for example 50% or 60% water recovery per stage. Interstage pumping may be required.

FIG. 4

Figure 4:
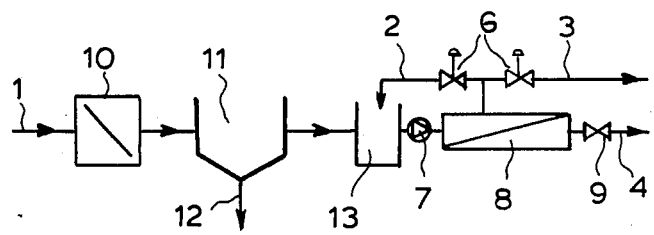
FIG. 4 is a generally schematic view, showing continuous effluent filtration in accordance with the invention.
Figure 5:
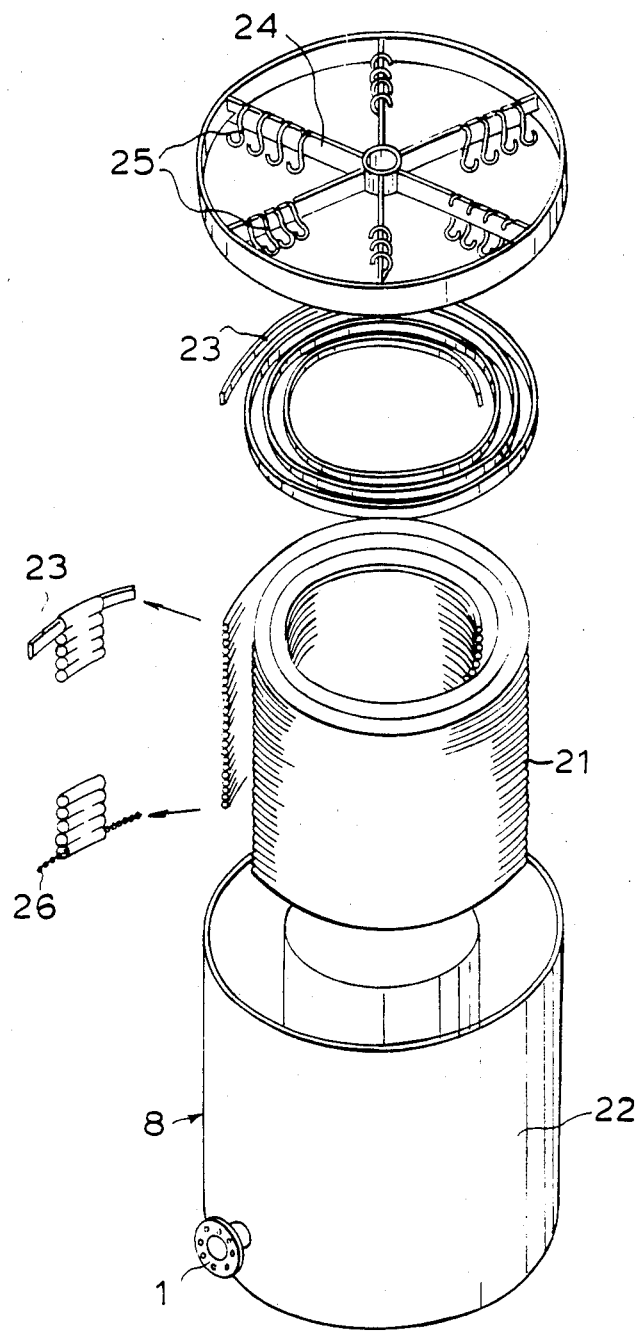
FIG. 5 is an exploded isometric view of a first filter in accordance with the invention (two details also being shown)

FIG. 4 shows the treatment of primary sewage effluent using an activated sludge process. The feed line 1 delivers sewage effluent to a device 10 for screening and grit removal and thence to a primary sedimentation tank 11, a sludge line 12 being shown. From the tank 11, the feed passes to a reactor in the form of an activated sludge aeration vessel 13. Sludge is continuously withdrawn from the vessel 13 by the pump 7, but concentrated sludge is returned along the line 2, rejected concentrate (surplus sludge) being passed along the line 3. Due to the ability of the filter 8 to continue working for long period, the vessel 13 can be operated with very high sludge concentrations, even up to 15% (dry weight).

FIGS. 5-10

FIGS. 5 to 10 show a spiral arrangement of a filter support 21 in accordance with the invention. The filter support 21 is in the form of an integral double cloth array forming a large number of tubes (see FIGS. 9 and 10). The filter support 21 can be as in Example 1 below. The filter support 21 is contained within an annular permeate tank 22 and is suspended in position by means of a stainless steel spiral 23 or other suitable support over which the top tube has been slid (or to which it has been fastened), which is in turn hung over, for example, a notched support member 24 by means of stainless steel hooks 25 or another suitable suspending method. Suitable weights 26 may be inserted in the bottom tube of the filter support 21, to cause it to hang vertically. The remaining tubes are available for the filter operation.

Figure 7:
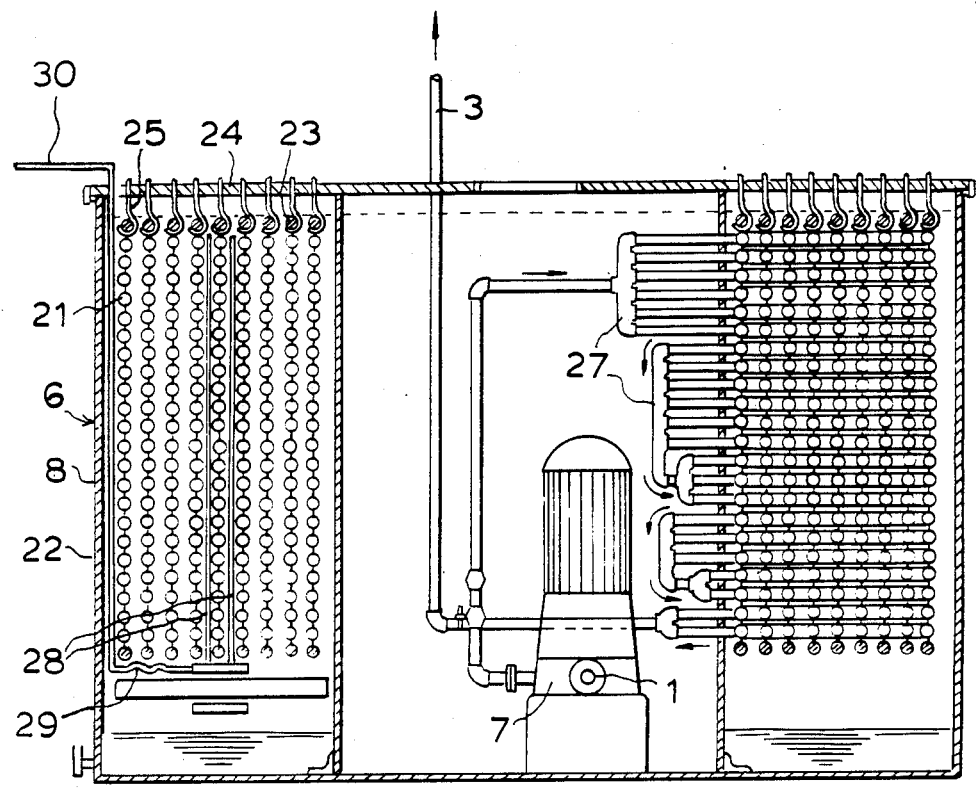
FIG. 7 is a vertical section along the plane VII—VII in FIG. 6.

Feed and return connections 27 are made at the ends of the tubes, and these connections 27 can be made up in manifolds as desired, the individual connections to the tubes being varied to suit applications. FIG. 7 indicates one possible arrangement. The connections 27 will blank off a short length at the end of each filter tube, but it is very small in relation to the uninterrupted area, less than 1%. The pump 7 is connected to the feed line 1. As can be seen, the permeate runs off the outside of the filter support 21 and collects in the bottom of the tank 22.

Figure 6:
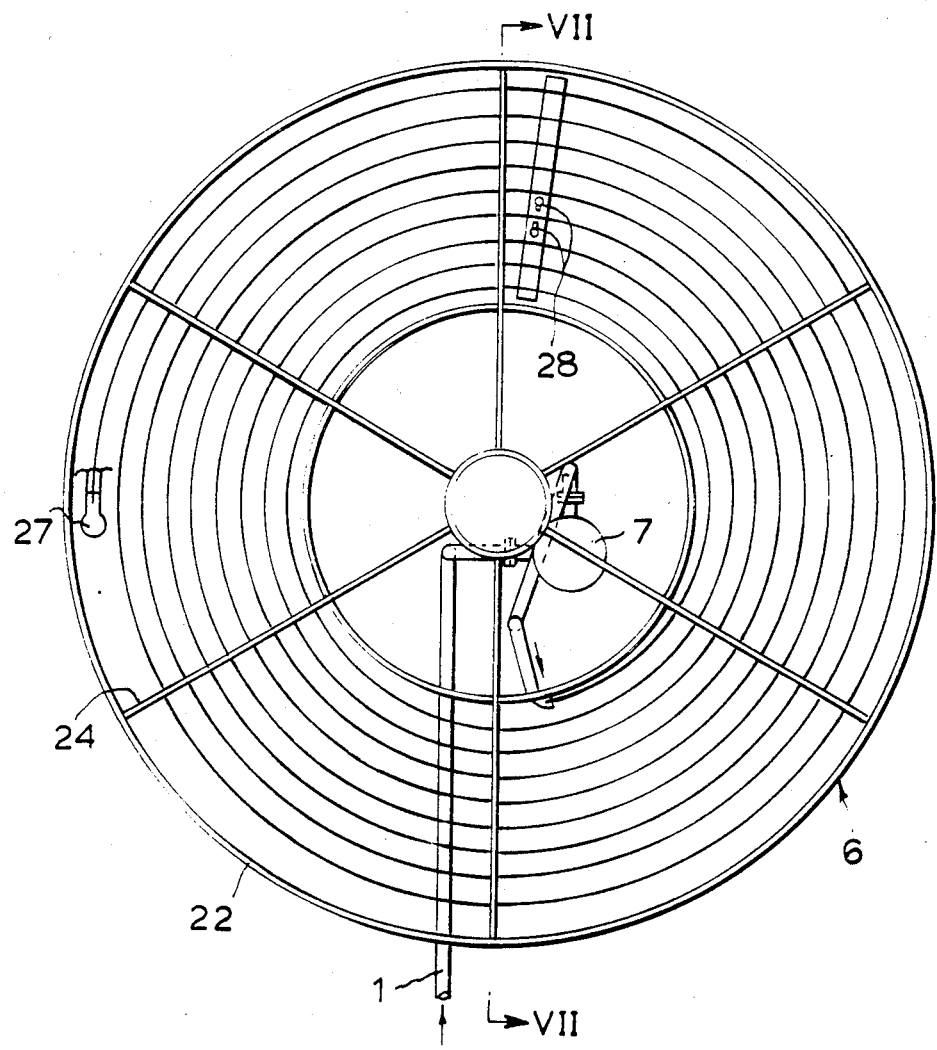
FIG. 6 is a plan of the filter of FIG. 5.
Figure 8:
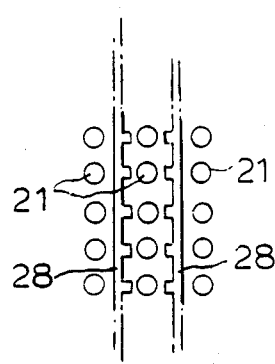
FIG. 8 is a detail of FIG. 7, showing part of the cleaning head.

FIGS. 6 to 8 show schematicatlly a cleaning head 28 comprising two legs, which is arranged to pass along a spiral path between the turns of the filter support 21 and projects a fluid from each leg in opposite radial directions onto the filter support 21 to clean and to stabilise the filter support 21 during the cleaning operation; there may be for example suitable nozzles arranged at intervals on the legs. The legs of the cleaning head 28 consist of pipes connected by a flexible pipe 29 to a fluid delivery system pipe 30.

On start-up, pre-coat is supplied from a feed tank (not shown) which is recycled until the membrane flux indicates that sufficient pre-coat has been applied. A normal filtration cycle then takes place, lasting a lengthy period. When cleaning is required, either at predetermined time intervals or by the lowering of the membrane flux to a minimum value, the feed is either discontinued or supplied at a reduced flow, causing the tubes of the filter support to relax; cleaning water is pumped through the cleaning head 28, flexing the filter support inwards in both directions (front and back), opening the pores and discharging particles from the filter support. The cleaning head 28 moves slowly along the spiral path of the filter support 21. The flushed water, both external and internal to the tubes, is returned to the supply tank 5 or drained. For heavy deposits on the inside on the tubes of the filter support 21, it is preferred that feed flow be supplied to the tubes to prevent accumulation of the deposits in the tubes and possible blockages.

The cleaning fluid supplied to the cleaning head 28 may alternatively be water, compressed air or other gas, mixtures of air or other gas and water, and may contain cleaning chemicals.

FIGS. 11 AND 12

Figure 11:
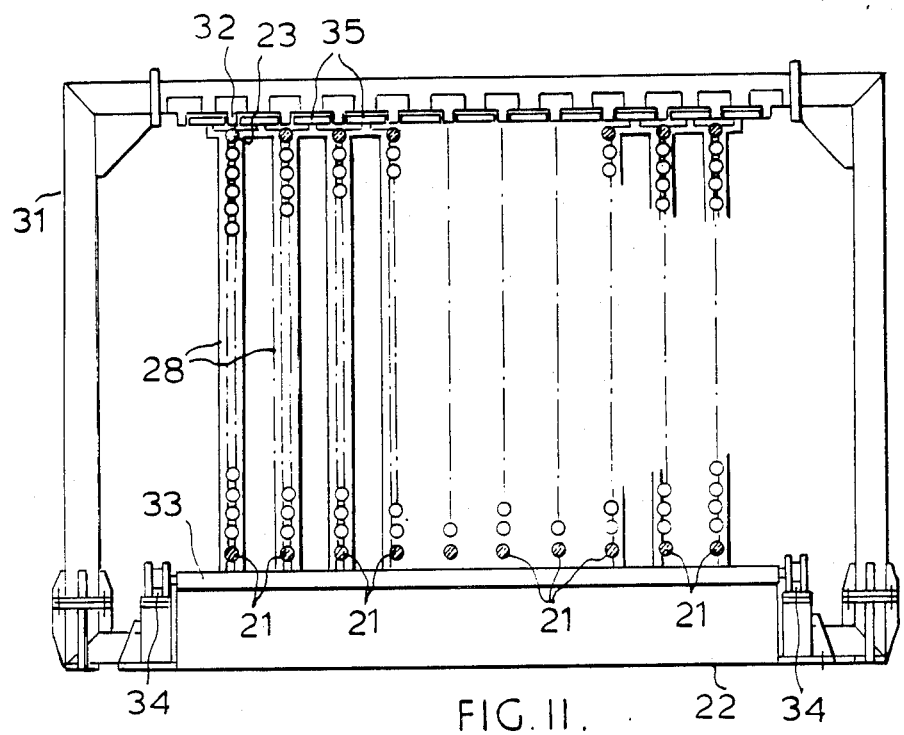
FIGS. 11 and 12 are a schematic vertical section and a schematic plan (on a smaller scale) of a second filter in accordance with the invention.
Figure 12:
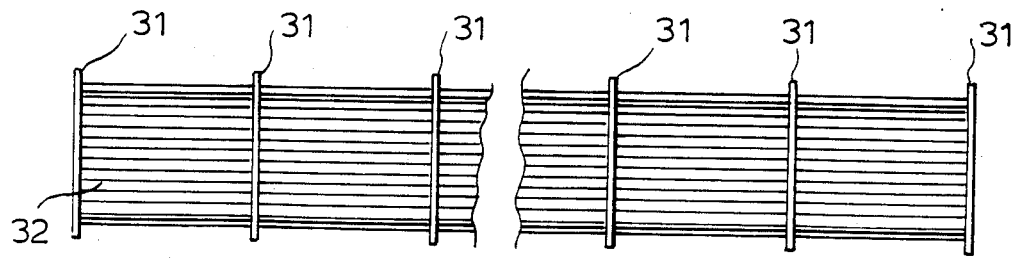

FIGS. 11 and 12 show another arrangement for using the same filter support 21. In this case several filter supports 21 are arranged in a linear configuration and supported from suitable frames 31. FIG. 11 shows the detail of the vertical section of a tubular metal support frame 31 and FIG. 12 a general plan layout of the support frames 31 and longitudinal support members 32. The frames 31 are repeated at suitable intervals determined from structural engineering considerations. The filter supports 21 are suspended in position by means of a stainless steel member or other suitable support members 23 over which the top tube has been slid or otherwise fastened, which in turn is attached to a longitudinal support member 32. The longitudinal support members 32 are attached to the frames 31 and run continuously in the longitudinal direction for the length of the filter supports 21.

The feed and return connections to the ends of the tubes of the filter support 21 are similar to those of FIGS. 5-10. A rectangular permeate tank 22 is used to collect permeate from the filter support. Multiple cleaning heads 28 moving in the longitudinal direction operate similarly to that described in FIGS. 6-8; they are carried on a trolley 33 which cracks on members 34 and upper members 35 slide along the sides of the longitudinal members 32.

FIG. 13

FIG. 13 shows a filter 8 in which the filter support is in the form of two webs 41, the feed being passed between the webs 41. As shown in FIG. 13, in operation the webs 41 bulge out, the arrangement being such that they do not quite touch the walls of a containing tank 42, thereby leaving unconstricted almost the whole area of the filter support. The tanks 42 can be made up in batteries, and the flow can be chosen as desired. The feed and concentrate connections 1,3 can be at the ends of the tanks 42 or on the long sides. A mesh spacer 43 is inserted between the webs 41 so that for back-flushing, a drainage space remains between the webs 41.

FIG. 14

FIG. 14 shows a different arrangement of a filter similar to that of FIG. 13, but using the multi-tube array 21 described above. The tank 44 is profiled so as to follow the surface profile of the array 21, with sufficient space to prevent the array 21 touching the sides of the tank 44. A similar arrangement could be used for the connections 27 in the filter of FIGS. 5 to 10.

FIGS. 15 AND 16

Figure 15:
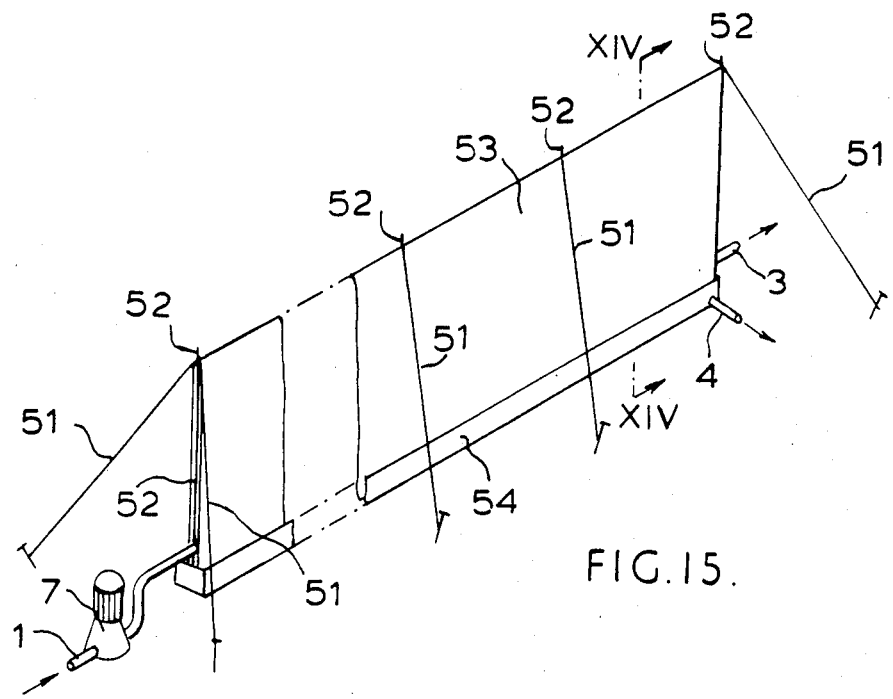
FIGS. 15 and 16 are a schematic isometric view of and a schematic vertical section through a fifth filter in accordance with the invention.
Figure 16:
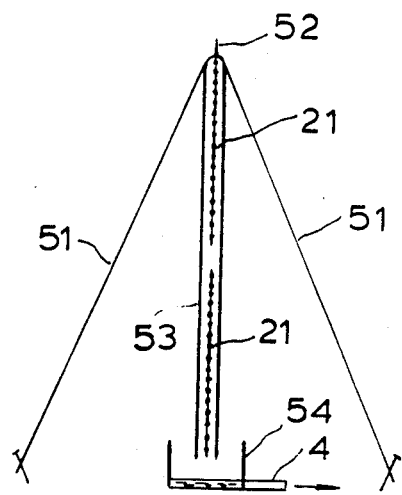

FIGS. 15 and 16 show a low-cost filter. A multi-tube array 21 is supported by guy-ropes 51 secured to stanchions 52. FIG. 16 shows two arrays 21, one above the other, but there may be a single array or parallel banks of arrays. The array(s) 21 are covered in a curtain 53 which hangs down each side and may be a plastics film or sheet such as polyethylene or polypropylene. The curtain 53 hangs down into a collection trough 54 in which the permeate is gathered. Each run of multi-tube array 21 could be up to say 80 m long—a 10 m run could filter 3 to 4 m² hour, enough for the water supply of a small village. A hand-held nozzle can be used for back flushing.

FIG. 19

FIG. 19 shows a cleaning arrangement in which bars 61 (which may be in the form of rollers) are moved along the outer face of each side of the filter support 21. The bars 61 have a diameter of 50% to 100% of the diameter of an individual tube of the support 21. The bars 61 flex both sides of the filter support inwards and are shown as reducing the diameter of the tube by about 50%, but the reduction could be about 5%, 25%, 75%, 90%, or 100% (fully closed), depending on circumstances. The bars 61 dislodge material on the filter support 21 and thereby clean the filter support 21. More particularly, it is believed that a venturi throat is formed within the filter (provided the tubes are not fully closed) and air may be sucked in through the filter (the same effect can be obtained with the opposed air jets, see FIGS. 6 to 8). This form of cleaning is found to be efficacious when filtering floc-type suspended matter.

The bars 61 should engage all the tubes of the filter support, which can be as in FIGS. 5-10 or as in FIGS. 11 and 12, the bars 61 being mounted like (and in place of) the cleaning heads 28. An alternative arrangement is to suspend the filter support(s) 21 so that adjacent turns or runs are almost touching, say 1 mm apart, and have a similar, say five, turns or runs of filter support 21 between each pair of bars 21, each turn or run being squeezed.

EXAMPLE 1 (Array of Tubes)

An array 21 of tubes was woven as a continuous fabric in the double cloth construction, with twenty four tubes being formed by arranging the weave, draft and peg-plan during weaving so as to form continuous tubes in the warp direction of the cloth, separated by cross-over lines formed by the weave interfacing (as shown in FIGS. 18a and 18b). If wider looms were used, the number and width of tubes could be formed. Ways of forming the tubes other than by using drop-stitches or weft crossing include subsequent stitching, glueing or similar.

One specific fabric was as follows (the figures in brackets indicate the range of, or alternative, values contemplated, though these are not exclusive):
Width of Sheet: 1050 mm (500–3000);
Length of Sheet: 95 m (0.5 or 10–200);
Tube internal diameter: 25 mm (5 or 10–200);
Width of filter support on one side of one tube: 39 mm;
Area of filter support formed by one side of one tube: 3.7 m²;
Total area available for membrane support (22 tubes): 163 m²;
Seam width between tubes: 4.5 mm (1–5);
Warp: 80 ends per cm (25–80 or 150);
Weft: 46 picks per cm (10–50 or 100);
Weight: 434 g per sq meter (100 or 200–1000 or 1500)— this is for both layers or plies and includes the seams;
Weave: 2×2, shown in FIG. 17 or more specifically as shown in FIGS. 18a and 18b (twills such as 1×2 or 2×1);
Yarn: Polyester (alternatives noted elsewhere);
Warp: 280 g/10⁴ m (Decitex), 72 18.8 micron diameter filaments per thread, elongation at break 47%±12%, break strength 10.7 Newtons±12%; low shrink, compacted, high tenacity;
Weft: 440 g/10⁴ m (Decitex), 120 18.2 micron diameter filaments per thread; air textured, entangled;
Mesh opening: not measured (5 or 20–300 microns);
Open area: not measured, but there was a loss of 15–21 m³/min of air per m² of filter support at 1.5 kPa;
Thickness of one wall of tube: 0.33 mm (0.1–0.8);
Overhanging length in specific flexibility test (see below) done on two slightly different samples (A and B) of Example 1 fabric—40 and 56 mm (10–80 or 100)—in a similar test a 100 mm length drooped by about 80° for both samples.

FIGS. 18a and 18b are a conventional weave diagram. The strip is taken across the width of the fabric and shows the repeat pattern, which will be repeated a number of times according to the number of tubes. Within this pattern, the zones x are the seams (or selvedge) and the zones y are the tubes;) the zones y will themselves be repeated according to the desired width of the tube, say seven times. A black square is where a warp thread is lifted over a weft thread. Two cloths or plies are woven, one above the other, but entanglement of both plies occurs at the selvedges and at the seams; the arrangement is such that the weft threads of one ply of one tube then become the weft threads of the other ply of the adjacent tube. A strip of not fully-cured polyvinyl chloride solution is applied along the seams (in a process such as "Zimmercoating") on one side or on each side of the fabric after weaving, impregnating the fabric; this strip can be wider than the seam, say 15 mm wide. Subsequently the fabric is heated to about 170° C. on a stenter or similar machine to fully cure the polyvinyl chloride. The strips become bonded to the woven polyester and form a strong durable seal to the zones or seams where the two plies of the fabric join; this prevents weeping at the seams and reduces the time taken to pre-coat. The strips could also be applied to the selvedges. During the heating process, the fabric may be heat shrunk or heat set.

The fabric is of such a kind that when subjected to a pressure of 88 p.s.i. over a period of three years, the cross-sectional area of the tube formed by the fabric does not increase by plastic creep by more than 5%. If excessive extensibility occurs, either on initial pressurisation and/or as the result of plastic creep, there will be unacceptable bleeding through—low extensibility would be less than 10% or preferably less than 5%.

Figure 9:
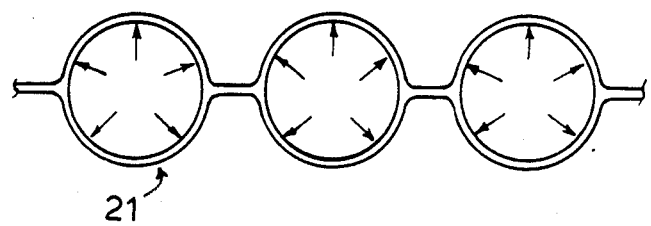
FIGS. 9 and 10 are enlarged, schematic, transverse sections through the filter support shown in FIGS. 5 to 8, FIG. 9 showing the filter support distended and FIG. 10 showing the filter support relaxed.
Figure 10:
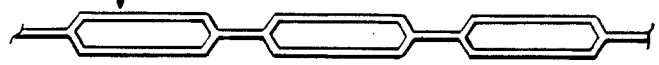

The tubes are highly flexible and when they are not pressurised, they collapse such that their cross-section is no longer circular but approximates to a flat polygon with a space of 1 mm between the two longer sides (compare FIGS. 9 and 10).

The preferred filter support tube structure incorporating high flexibility, weave tightness to permit the separation of suspended solids and type of weave to facilitate cleaning, has in addition to provide a suitable pressure rating to permit long tube lengths (up to 200 m) to be connected in series or parallel. Preferred tube burst pressures are above 1000 kPa or in a wider range, from 59 to 1,200 p.s.i. depending on the construction material of the filter support. In the case of woven filter supports, the weave pattern and types of fibres, filaments or yarns are chosen to minimise opening of the pores of the filter support during operation under pressure.

On large lengths of filter support or tubes comprising the filter support, the frictional pressure drop may be high and interstage pumping may be a requirement for high velocity applications. The pressure rating should be such as to permit long tube lengths (up to 200 m) to be connected in series.

Practical velocities are usually in the range 1-3 or 5 m/s, a pressure drop of 10 to 370 p.s.i. being expected for a hundred meter tube length of internal diameter 25 mm. One can aim for a velocity of say 3 m/s at the inlet end of a tube and 1 m/s at the outlet end. The inherent water flux is usually in excess of 1500 liters/m²h at 22 p.s.i., but this is usually reduced by the addition of the pre-coat, to an extent dependent on the chemicals or substances used.

Table 1 provides information on module sizes for 25 mm internal diameter tubes as above, considering a 22 tube module. For experimental purposes, the filter of FIGS. 5 to 10 was used, the modules being mounted in a tank whose dimensions (diameter×height) are given in Table 1.

TABLE 1

| Tube length, m: | 50 | 100 | 200 |
|---|---|---|---|
| Membrane area, m²: | 85 | 170 | 340 |
| Tank Dimensions, m: | 1.7 × 1.2 | 2.2 × 1.2 | 3.0 × 1.2 |

EXAMPLE 2 (Process)

As an example, a batch concentration mode of operation is used, on the minimum exit velocity basis. The filter was as in FIGS. 5 to 7, the tank being 1.2 m high, the arrangement was as in FIG. 1, and the filter support was as in Example 1. Details are:

Design flow: 1000 m³/d
Design flux: 250 l/m²·h (6 m³/m²·d)
Design suspended solids (SS) in feed: 50 mg/l
Minimum tube velocity: 1 m/s
Water recovery: 98%
Parallel connection:
Calculated exit flow: 935 m³/d (1 m/s)
Calculated inlet flow: 1915 m³/d (2.1 m/s)
Membrane area: 163 m²
Tube length: 95 m
Pressure drop: 21 p.s.i.
Pressure range: 50 p.s.i. (inlet pressure)—29 p.s.i. (outlet pressure)
Final SS concentration: 2500 mg/l By reducing the number of parallel tubes and increasing the tube length, the pumping volume would be reduced.

EXAMPLE 3 (Specific Process)

A small pilot unit was set up at a factory to treat factory effluent for the removal of organic matter and suspended solids. The effluent was dosed with 25 mg/l $Fe^{+++}$ as ferric sulphate. The operating conditions were:

Filter: as in FIGS. 5 to 10
Filter support: as in Example 1
Membrane: self-formed
Inlet pressure=35 p.s.i.-62 p.s.i.
Outlet pressure=6 p.s.i. to 10 p.s.i.
Temperature=ambient.
Filter tube area=11 m²

The permeate flux was 250 to 320 l/m²h under this range of operating conditions for a batch concentration of the feed to the filter of 7600 to 21500 mg/l suspended solids measured at the reject end of the filter. The permeate (product) contained less than 0.3 mg/l of suspended solids.

OTHER SPECIFIC APPLICATIONS

Other specific applications are:

treatment of activated sludge clarifier overflow with both domestic and factory effluent, prior to reverse osmosis;

treatment of cooling water blowdown prior to reverse osmosis;

treatment of oil refinery effluent with trace oil and colloidal/suspended particles, prior to reverse osmosis;

removal of colloidal iron from condensate loops (e.g. power stations with dry cooling);

treatment of pulp/paper effluents, e.g. calcium sulphite pulping wash liquor, paper machine clarifier overflow effluent, paper machine noodle effluent, pulp mill chlorination stage effluent, and paper machine wastewaters in general;

treatment of tannery effluents of three different types, namely from skin curing, from wet-blue tannery and from combined liming, lime wash and chrome wash effluents;

filtration of fermentation liquors;

treatment of yeast factory effluent;

treatment of textile polyester dyeing effluents;

treatment of printing effluents;

water treatment to remove inorganic constituents such as precipitated calcium and possibly magnesium hardness, when softening water;

phosphate removal;

packaged water supply units;

development into a low cost, partial salt rejection membrane system;

in an anoxic effluent treatment system, for denitrifying water (reducing nitrate concentration)—a biomass is developed aerobically by feeding a suitable organic compound such as methanol to a simple uniformly-mixed aerated fermentor seeded with e.g. activated-sludge; when the biomass has developed to a sufficient concentration, water containing the nitrate is fed and aeration is switched off, the organic compounds such as methanol feeding the oxygen demand of the biomass and reducing the nitrate ion to gaseous nitrogen; the biomass is separated by the filter of the invention and returned to the fermentor, the permeate being denitrified water;

replacing the sedimentation stage of an anaerobic contact reactor by the filter of the invention, in order to be able to operate with higher biomass concentrations and thus shorter detention times.

FLEXIBILITY TESTING

A specific flexibility test (SFT) was initially carried out on the fabric of Example 1 to determine the projecting or overhanging length which gave a droop angle or angle of inclination of 45°. It has now been appreciated that there is a similar test in British Standard (BS) 3356: 1961, the only significant difference in procedure being the adoption of a 41.5° angle of inclination. The SFT is therefore the test of BS 3356: 1961 substituting a 45° angle for the 41.5° of the BS test. However, the overhanging length is expressed as such wherein in the BS test the "bending length" is half the overhanging length. In the range concerned, the correlation seemed good, the BS bending length being equal to the SFT overhanging length divided by 2.1 (see Table 2 below). In Tables 2 and 3, the asterisked values are calculated on this basis.

British Standard 3356: 1961 (Method for the Determination of Stiffness of Cloth) describes a method for the determination of the bending length and flexural rigidity of textile fabrics by means of a fixed-angle flexometer. Flexural rigidity is therein defined as the ratio of the small change in bending moment per unit width of the material to the corresponding small change in curvature, in units of mg.cm. This quantity is a measure of stiffness, or resistance of the cloth to bending by external forces. Bending length is defined therein as the cube root of the ratio of the flexural rigidity to the weight per unit area of the fabric. Bending length is also described as being equal to the length of a rectangular strip of material that will bend under its own weight to an angle of 7.1°; and the units are in cm. Flexural rigidity is retained from the bending length and the weight per unit area of the fabric. The essential features of the fixed-angle flexometer are a horizontal platform having a slide with a graduated scale which indicates the bending length of the fabric which is placed upon the horizontal platform. Siting lines pass through the upper forward edge of the horizontal platform and are inclined at an angle of $41\frac{1}{2}°$ below the horizontal, and are inscribed on transparent side pieces of the instrument. A rectangular strip of fabric is supported on a horizontal platform in a direction perpendicular to one edge of the platform. The strip is traversed in the direction of its length so that an increasing part overhangs and bends down under its own weight. When the tip of the specimen has through the edge of the platform and is inclined at an angle of $41\frac{1}{2}°$ below the horizontal, the overhanging length is equal to twice the bending length of the specimen. The atmospheres required for conditioning testing are:

(a) for preconditioning—an atmosphere of relative humidity not exceeding 10% and a temperature not exceeding 50° C. (122° F.).

(b) for conditioning and testing—an atmosphere having a relative humidity of 65±2% and temperature of 20±2° C. (68±4° F.). Flexural rigidity is calculated separately for the warp and weft directions. Where C is the mean bending length, G is the flexural rigidity, $W_1$ is the cloth weight in g/sq m, and $W_2$ is the cloth weight in oz/sq yd, $G = 0.10 \, W_1 \, C^3$ mg cm $G = 3.4 \, W_2 \, C^3$ mg cm.

In the test, a rectangular strip of a single ply (or wall) of the filter support is cut (if there is a tube, so that the axis of the tube is parallel to the long side of the rectangle); if the seams are coated, the strip should be cut so as to include no coating. As such a strip will only give the "axial" bending length or overhang for a tube, estimates can be made of the flexibility in the direction at 90°, giving a transverse bending length or overhang. Preferably the "axial" and "transverse" flexural rigidities are roughly similar and it is preferred that one is not more than ten or five, but preferably three, times the other; more generally it is preferred that the flexural rigidity is roughly the same in all directions, the flexural rigidity in any direction preferably not being more than ten or five or three times that in any other direction. The diameter of the tube was too small to give proper test strips for transverse measurements, and estimates were made using strips cut across the array of tubes, comparing the bending with that of complete tubes in the axial direction—in each case, the tube was flattened with the opposing walls in contact. Table 4 expresses such results. No transverse result could be obtained for the fire hose, but it was believed that the transverse flexural rigidity was much greater than the axial flexural rigidity.

The test results expressed above do not eliminate the effect of the weight of the material. When concerned with a narrow range of weights, as in the preferred embodiments of the present invention, this is not of great significance. BS 3356: 1961 explains how to obtain a weight-corrected value, namely the flexural rigidity. An equivalent SFT weight-corrected value or SFT rigidity can be obtained by the formula $0.1 \, W_1 L^3$ where $W_1$ is the weight in g/m² and L is the overhanging length in cms. The original testing was carried out on a double-ply fabric of weight 434 g/m² (single-wall weight 217 g/m²); the actual overhanging length was 40 mm but the preferred maximum was 80 or 100 mm; these lengths give preferred maximum BS bending lengths of about 38 or 48 mm (say 40 or 50 mm), maximum SFT rigidities of 11110.4 or 21700 (mg.cm) (say 11000 or 22000 (mg.cm)) and maximum BS flexural rigidities of 1191 or 2400 mg.cm (say 1200 or 2400 or preferably 2500 mg.cm).

Tables 2 to 4 below set out mean test results for four suitable samples and for a relatively flexible fire hose carcase. Samples A and B are as for Example 1 and Samples C and D were made as in Example 1 but woven with 22 tubes (and Sample C is of slightly differing weave). The strips cut were 200×25 mm.

TABLE 2

|  | B.S. overhanging length mm | SFT overhanging length mm | SFT/BS ratio |
| --- | --- | --- | --- |
| Sample A | 38.0* | 40.0 | 1.05* |
| Sample B | 52.1 | 56.0 | 1.07 |
| Sample C | 48.5 | 51.4 | 1.06 |
| Sample D | 69.3 | 72.9 | 1.05 |
| Fire hose carcase | 77.9 | 81.2 | 1.04 |

TABLE 3

|  | B.S. bending length cm | B.S. flexural rigidity mg.cm | SFT overhanging length cm | SFT rigidity mg.cm | Weight g/m² |
| --- | --- | --- | --- | --- | --- |
| Sample A | 1.90* | 149* | 4.00 | 1389 | 217 |
| Sample B | 2.60 | 368 | 5.60 | 3670 | 209 |
| Sample C | 2.43 | 267 | 5.14 | 2526 | 186 |
| Sample D | 3.46 | 868 | 7.29 | 8097 | 209 |
| Fire hose carcase | 3.90 | 5101 | 8.12 | 46150 | 862 |

TABLE 4

|  | B.S. bending length (tube) cm | B.S. flexural rigidity (tube) mg.cm | SFT overhanging length (tube) cm | SFT rigidity (tube) mg.cm | Weight g/sq m |
| --- | --- | --- | --- | --- | --- |
| Sample A tube (axial) | 4.68 | 4449 | 9.68 | 39366 | 434 |
| Sample A tube (transverse) | 3.50 | 1861 | 7.20 | 16199 | 434 |
| Fire hose carcase tube (axial) | 7.30 | 67533 | 15.9 | 697816 | 1736 |

We claim:

1. In a cross-flow filter comprising: means for mounting a filter support in position; a flexible filter support mounted by the mounting means; an inlet for leading feed to said filter support; an outlet for permeate which has passed through said filter support; and an outlet for concentrate which has not passed through said filter support;

the improvement that said filter support is in the form of a material having two plies which are connected together at parallel, spaced means to form an integral array of side-by-side, continuous, separate tubes, said seams being strong enough to resist a relative pressure of about 59 p.s.i. in said tubes, and said plies providing tube walls each of which has a flexural rigidity in at least one direction greater than zero and of not more than 2500 mg.cm according to British Standard 3356: 1961, said inlet being connected to the interior of said tubes whereby when said tubes are under the pressure of said feed, said walls provide an uninterrupted filter zone of substantial area which is restrained during filtration solely by tensile forces in said walls, substantial movement of said walls being possible in the direction at right angles to said walls when the pressures inside said tubes and outside said tubes are equal.

2. The filter of claim 1, wherein the filter support has a wall thickness of not more than 1 mm.

3. The filter of claim 1, and comprising a cleaning head for projecting at least one jet of fluid at said filter support in the opposite direction to the filtration direction, thereby flexing said filter support, and means for inducing relative motion between said cleaning head and said filter support lengthwise of said filter support.

4. The filter of claim 3, wherein said filter support provides two walls and said inlet passes feed between said walls, and further comprising cleansing means for projecting oppositely-directed jets of fluid at said walls in the opposite direction to the filtration direction, thereby flexing said walls towards each other.

5. In a cross-flow filter comprising: means for mounting a filter support in position; a flexible filter support mounted by the mounting means; an inlet for leading feed to said filter support; an outlet for permeate which has passed through said filter support; and an outlet for concentrate which has not passed through said filter support;

the improvement that said filter support is in the form of a material of a tight textile construction of high pressure rating and low extensibility having two plies which are entangled together at parallel, spaced seams to form an integral array of side-by-side, continuous, separate tubes, said seams being strong enough to resist a relative pressure of about 59 p.s.i. in said tubes, and said plies providing tube walls each of which has a flexural rigidity in at least one direction greater than zero and of not more than 2500 mg.cm according to British Standard 3356: 1961, said inlet being connected to the interior of said tubes whereby when said tubes are under the pressure of said feed, said walls provide an uninterrupted filter zone of substantial area which is restrained during filtration solely by tensile forces in said walls, substantial movement of said walls being possible in the direction at right angles to said walls when the pressures inside said tubes and outside said tubes are equal.

6. In a cross-flow filter comprising: means for mounting a filter support in position; a flexible filter support mounted by the mounting means; an inlet for leading feed to said filter support; an outlet for permeate which has passed through said filter support; and an outlet for concentrate which has not passed through said filter support;

the improvement that said filter support is in the form of a woven material formed of longitudinal threads and transverse threads and having two plies which are connected together at parallel, spaced seams to form an integral array of side-by-side, continuous, separate tubes extending parallel to said longitudinal threads, at said seams the transverse threads of one ply passing under at least one longitudinal thread over which the transverse threads of the other ply pass, said seams being strong enough to resist a relative pressure of about 59 p.s.i. in said tubes, and said plies providing tube walls each of which has a flexural rigidity in at least one direction greater than zero and of not more than 2500 mg.cm according to British Standard 3356: 1961, said inlet being connected to the interior of said tubes whereby when said tubes are under the pressure of said feed, said walls provide an uninterrupted filter zone of substantial area which is restrained during filtration solely by tensile forces in said walls, substantial movement of said walls being possible in the direction at right angles to said walls when the pressure inside said tubes and outside said tubes are equal.

7. The filter of claim 6, and comprising a member movable along the outside of said filter support to flex said filter support inwards and dislodge material on said filter support and thereby clean said filter support, and means for inducing relative motion between said cleaning member and said filter support lengthwise of said filter support.

8. The filter of claim 7, wherein two said cleaning members are provided on the outside of each of said two walls, for flexing in each said wall.

9. The filter of claim 7, wherein said movable member physically contacts respective said walls of said tubes and flexes said walls inwards.

10. The filter of claim 6, wherein the filter support is woven.

11. The filter of claim 6, wherein the filter support is in the form of a spiral with spaces between the turns, the arrangement between such that the feed passes around the spiral.

12. The filter of claim 6, wherein said mounting means mounts a plurality of spaced, parallel said filter supports.

13. The filter of claim 6, and comprising cleaning head means movable along the outside of said filter support and on either side of said filter support, for projecting opposed jets of fluid at said opposite sides of said filter support to flex said filter support inwards and dislodge material on said filter support and thereby clean said filter support, and means for inducing relative motion between said cleaning head means and said filter support lengthwise of said filter support.

14. The filter of claim 6, wherein the transverse threads of one ply of one tube become the transverse threads of the other ply of the next tube, the transverse threads thereby crossing over at the seams.

15. In a cross-flow filter comprising: means for mounting a filter support in position; a flexible filter support mounted by the mounting means; an inlet for leading feed to said filter support; an outlet for permeate which has passed through said filter support; and an outlet for concentrate which has not passed through said filter support;

the improvement that said filter support is in the form of a woven material formed of longitudinal threads and transverse threads and having two plies which are connected together at parallel, spaced seams to form an integral array of side-by-side, continuous, separate tubes extending parallel to said longitudinal threads, at said seams the transverse threads of one ply passing under at least one longitudinal thread over which the transverse threads of the other ply pass, said seams being strong enough to resist a relative pressure of about 59 p.s.i. in said tubes, and said plies providing tube walls each of which has a flexural rigidity such that a rectangular piece having four sides cut from the wall and placed on a horizontal table with an edge of the table parallel to one of the sides of the piece protrudes 100 mm or less to obtain a droop angle of the protrusion of 45° with the piece clamped by a clamping member aligned with the edge of the table, which protrusion is greater than zero, said in inlet being connected to the interior of said tubes whereby when said tubes are under the pressure of said feed, said walls provide an uninterrupted filter zone of substantial area which is restrained during filtration solely by tensile forces in said walls, substantial movement of said walls being possible in the direction at right angles to said walls when the pressures inside said tubes and outside said tubes are equal.

16. A method of cross-flow filtration, comprising using a flexible filter support in the form of a material having two plies which are connected together at parallel, spaced seams to form an integral array of side-by-side, continuous, separate tubes, said seams being strong enough to resist a relative pressure of about 59 p.s.i. in said tubes, and said plies providing tube walls each of which has a flexural rigidity in at least one direction greater than zero and of not more than 2500 mg.cm according to British Standard 3356: 1961, said inlet being connected to the interior of said tubes whereby when said tubes are under the pressure of said feed, said walls provide an uninterrupted filter zone of substantial area which is restrained during filtration solely by tensile forces in said walls, feed being passed under pressure into said tubes, thereby bulging out said walls of said tubes beyond a planar configuration and permeate passing through said walls of said tubes, and whereby substantial movement of said walls of said tubes is possible in the direction at right angles to said walls when the pressures inside said tubes and outside said tubes are equal.

17. The method of claim 16, wherein said flexible filter support is in the form of a double cloth woven material of tight textile construction of high pressure rating and low extensibility, formed of threads extending longitudinally of said tubes and threads extending transversely of said tubes, and at said seams the transverse threads of one ply passing under at least one longitudinal thread over which the transverse threads of the other ply pass.

18. The method of claim 16, wherein in order to clean said filter support while the pressure in said tubes is maintained, a member is moved in the direction of the axis of a said tube in contact with a said wall of the tube, thereby flexing said wall inwards and dislodging material on the inner face of said wall.

19. The method of claim 18, wherein there are two said members, opposite each other on either side of said tube, each said member engaging a respective said wall.

20. A method of cross-flow filtration, comprising using a flexible filter support in the form of a material of a tight textile construction of high pressure rating and low extensibility having two plies which are entangled together at parallel, spaced seams to form an integral array of side-by-side, continuous, separate tubes, said seams being strong enough to resist a relative pressure of about 59 p.s.i. in said tubes, and said plies providing tube walls each of which has a flexural rigidity in at least one direction greater than zero and of not more than 2500 mg.cm according to British Standard 3356: 1961, said inlet being connected to the interior of said tubes whereby when said tubes are under the pressure of said feed, said walls provide an uninterrupted filter zone of substantial area which is restrained during filtration solely by tensile forces in said walls, substantial movement of said walls being possible in the direction at right angles to said walls when the pressures inside said tubes and outside said tubes are equal.

21. A filter support for a cross-flow filter which comprises: means for mounting a filter support in position; a flexible filter support mounted by the mounting means; an inlet for leading feed to the filter support; an outlet for permeate which has passed through the filter support; and an outlet for concentrate which has not passed through the filter support;

said filter support being in the form of a material having two plies which are connected together at parallel, spaced seams to form an integral array of side-by-side, continuous, separate tubes, said seams being strong enough to resist a relative pressure of about 59 p.s.i. in said tubes, and said plies providing tube walls each of which has a flexural rigidity in at least one direction greater than zero and of not more than 2500 mg.cm according to British Standard 3356: 1961, said inlet being connectable to the interior of said tubes whereby when said tubes are under the pressure of said feed, said walls provide an uninterrupted filter zone of substantial area which is restrained during filtration solely by tensile forces in said walls, substantial movement of said walls being possible in the direction at right angles to said walls when the pressures inside said tubes and outside said tubes are equal.

22. The filter support of claim 21, wherein the filter support has a wall thickness of not more than 1 mm.

23. The support of claim 21, wherein said flexible filter support is in the form of a double cloth woven material of tight textile construction of high pressure rating and low extensibility, formed of threads extending longitudinally of said tubes and threads extending transversely of said tubes, and at said seams the transverse threads of one ply passing under at least one longitudinal thread over which the transverse threads of the other ply pass.

24. The filter support of claim 23, wherein the transverse threads of one ply of one tube become the transverse threads of the other ply of the next tube, the transverse threads thereby crossing over at the seams.

25. A filter support for a cross-flow filter which comprises: means for mounting a filter support in position; a flexible filter support mounted by the mounting means;

an inlet for leading feed to the filter support; an outlet for permeate which has passed through the filter support; and an outlet for concentrate which has not passed through the filter support;

said filter support being in the form of a material of a tight textile construction of high pressure rating and low extensibility having two plies which are entangled together at parallel, spaced seams to form an integral array of side-by-side, continuous, separate tubes, said seams being strong enough to resist a relative pressure of 59 p.s.i. in said tubes, and said plies providing tube walls each of which has a flexural rigidity in at least one direction greater then zero and of not more than 2500 mg.cm according to British Standard 3356: 1961, said inlet being connected to the interior of said tubes whereby when said tubes are under the pressure of said feed, said walls provide an uninterrupted filter zone of substantial area which is restrained during filtration solely by tensile forces in said walls, substantial movement of said walls being possible in the direction at right angles to said walls when the pressures inside said tubes and outside said tubes are equal.

26. The filter support of claim 25, and woven.

27. A plant for effluent treatment, and comprising a cross-flow filter comprising: means for mounting a filter support in position; a flexible filter support mounted by the mounting means; an inlet for leading feed to said filter support; an outlet for permeate which has passed through said filter support; and an outlet for concentrate which has not passed through said filter support; and wherein said filter support is in the form of a material having two plies which are connected together at parallel, spaced seams to form an integral array of side-by-side, continuous, separate tubes, said seams being strong enough to resist a relative pressure of about 59 p.s.i. in said tubes, and said plies providing tube walls each of which has a flexural rigidity in at least one direction greater than zero and of not more than 2500 mg.cm according to British Standard 3356: 1961, said inlet being connected to the interior of said tubes whereby when said tubes are under the pressure of said feed, said walls provide an uninterrupted filter zone of substantial area which is restrained during filtration solely by tensile forces in said walls, substantial movement of said walls being possible in the direction at right angles to said walls when the pressures inside said tubes and outside said tubes are equal.

28. The plant of claim 27, wherein the filter support is in the form of a woven double-cloth material of tight textile construction of high pressure rating and low extensibility, and in which said seams have been formed by entanglement.

29. The plant of claim 27, wherein said flexible filter support is in the form of a double cloth woven material of tight textile construction of high pressure rating and low extensibility, formed of threads extending longitudinally of said tubes and threads extending transversely of said tubes, and at said seams the transverse threads of one ply passing under at least one longitudinal thread over which the transverse threads of the other ply pass.

30. A method of micro-filtration, comprising using a flexible filter support in the form of a material of a tight textile construction of high pressure rating and low extensibility having two plies which are entangled together at parallel, spaced seams to form an integral array of side-by-side, continuous, separate tubes, said seams being strong enough to resist a relative pressure of about 59 p.s.i. in said tubes, and said plies providing tube walls each of which has a flexural rigidity in at least one direction greater than zero and of not more than 2500 mg.cm according to British Standard 3356: 1961, said inlet being connected to the interior of said tubes whereby when said tubes are under the pressure of said feed, said walls provide an uninterrupted filter zone of substantial area which is restrained during filtration solely by tensile forces in said walls, substantial movement of said walls being possible in the direction at right angles to said walls when the pressures inside said tubes and outside said tubes are equal.

* * * * *